United States Patent [19]
Leuchter, Jr.

[11] 3,968,570
[45] July 13, 1976

[54] ELECTRONIC SEXTANT

[76] Inventor: Fred A. Leuchter, Jr., 174 Belmont St., Malden, Mass. 02148

[22] Filed: Aug. 12, 1974

[21] Appl. No.: 496,392

Related U.S. Application Data

[63] Continuation-in-part of Ser. No. 377,753, July 9, 1973, abandoned.

[52] U.S. Cl. .................................. 33/267; 33/268; 356/140
[51] Int. Cl.² .......................................... G01C 1/08
[58] Field of Search ............. 33/1 D, 1 N, 1 L, 1 T, 33/1 PT, 267, 268, 269, 277; 356/138, 140, 144, 145

[56] References Cited
UNITED STATES PATENTS

| | | | |
|---|---|---|---|
| 2,463,649 | 3/1949 | Sheffield | 33/1 D |
| 2,941,082 | 6/1960 | Carbonara et al. | 33/268 |
| 3,571,567 | 3/1971 | Eckermann | 33/268 |
| 3,752,591 | 8/1973 | Feldman | 356/140 |

FOREIGN PATENTS OR APPLICATIONS

| | | | |
|---|---|---|---|
| 358,451 | 9/1922 | Germany | 33/268 |
| 361,407 | 11/1931 | United Kingdom | 33/268 |

*Primary Examiner*—Samuel B. Rothberg
*Assistant Examiner*—Richard R. Stearns
*Attorney, Agent, or Firm*—William C. Roch

[57] ABSTRACT

An improved sextant which provides a very accurate angular measurement of the position of a celestial body relative to the horizon. The sextant is a typical prior art sextant having a horizon glass and an index mirror, and wherein the sextant is sighted by adjusting the angular position of the index mirror to align an image of the celestial body with a sighting of the horizon. An angular position encoder is coupled to the index mirror to provide a digital electrical output signal indicative of the exact angular position of the index mirror. The sextant includes an electrical clock for producing an electrical output signal which indicates the exact time the sighting is taken. The sextant includes electronics for automatically synchronizing the electrical output signal from the encoder with the electrical output signal from the clock. The electrical output signals are in a form suitable for further electrical processing and automatic data reduction to automatically and simultaneously provide the navigator with a final positional output once he has taken several sightings.

The sextant may be operated in any one of the three modes. The first mode allows an instantaneous sight to be taken, and the sextant provides an instantaneous readout of the encoder and the clock. In a second mode, an averaged sighting is made automatically. In a third mode, the clock within the sextant is utilized solely as a chronometer.

6 Claims, 3 Drawing Figures

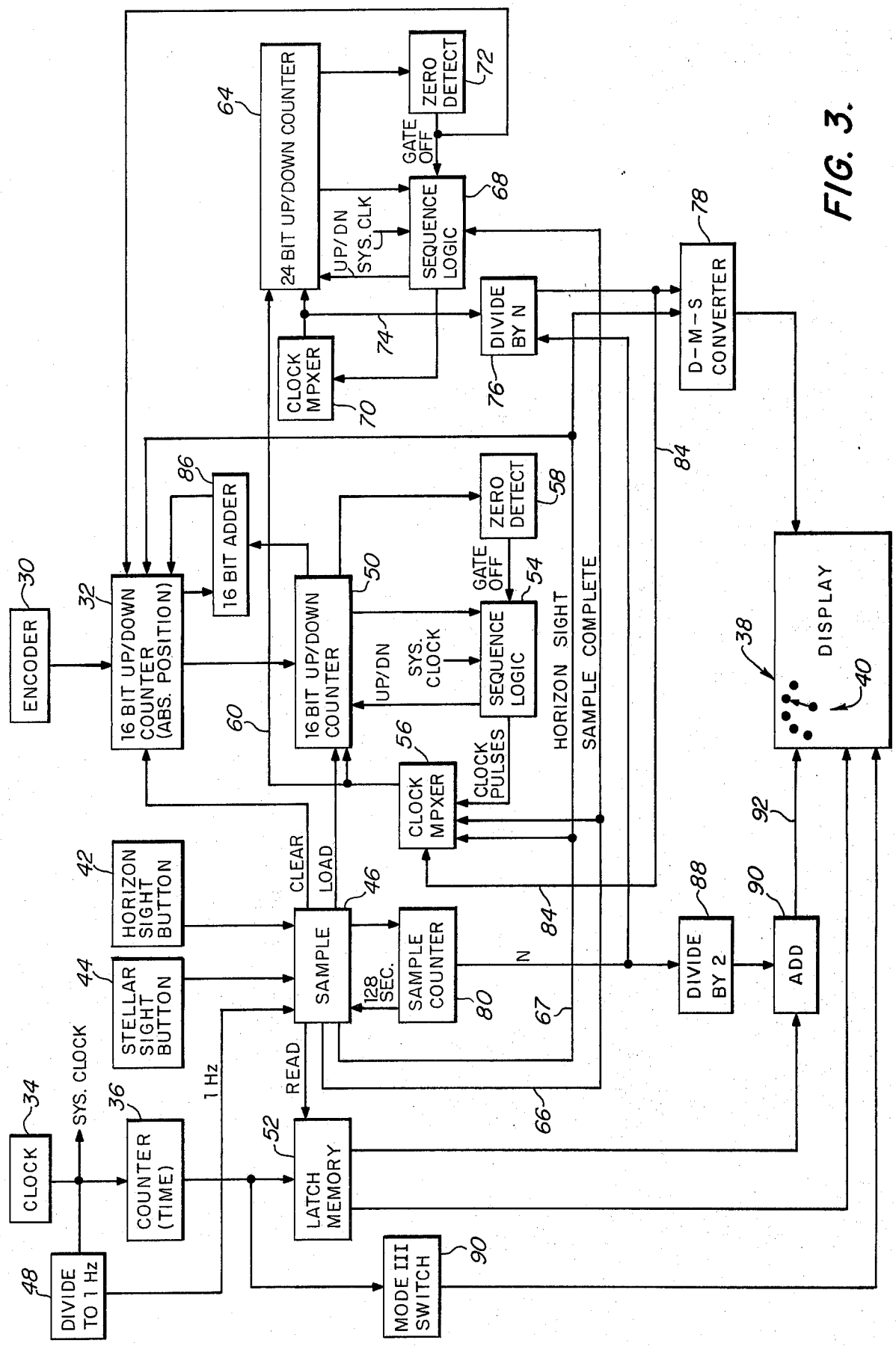

ELECTRONIC SEXTANT

This patent application is a continuation-in-part application of patent application Ser. No. 377,753 filed July 9, 1973, now abandoned, by Fred A. Leuchter, Jr., for SEXTANT IN COMBINATION WITH OPTO-ELECTRICAL MECHANICAL CONVERTER MEANS HAVING A DIGITAL SHAFT ENCODER.

BACKGROUND OF THE INVENTION

The present invention relates generally to the sextant arts, and more particularly pertains to a new and improved sextant which utilizes a digital encoder to obtain a digital output signal which is an exact indication of the sextant reading.

A sextant is an optical instrument used by a navigator to determine position on the earth. The instrument basically measures the altitude of a celestial body, which is the angular position of that body above the horizon. Several altitude measurements relative to several celestial bodies are then utilized to solve multiple algebraic equations. These equations are derived from spherical geometry, and a navigational triangle is solved for the measurement of each celestial body. Even today, this solution supplies the navigator with the most accurate measurement of his position (latitude and longitude) currently obtainable. Today, most of the mathematics have been precomputed, and the navigator need only consult his Sight Reduction Tables, do some simple addition and subtraction, and finally plot the results on a chart to determine his position on earth.

The major problem with present sextants is accuracy. The accuracy of the sextant sightings determine the accuracy of the finally computed position on earth. The accuracy problem is multifold; the first problem is the inherent accuracy of the instrument; the second problem is the accuracy of the navigator's sighting of the instrument, which is often encumbered by adverse conditions such as movement, vibration, oscillation, etc. In the art today, the basic instrument accuracy of a standard marine sextant is about 5 seconds arc, but the navigator can only interpolate a reading to 12 seconds of arc and can only sight and align the instrument to about 18 seconds arc. Because of difficulty in sighting the sextant, mechanical instruments, which average a number of sights over a time period, have been used to overcome this problem. Such a mechanically averaging sextant is illustrated in U.S. Pat. No. 2,140,579, for Averaging Device, by Gray. With that sextant, the readout is a mathematical average of a number of sights taken over a given time period. One disadvantage of such a sextant is that it inherently has low accuracy (approximately 2 minutes arc) which limits its use to aircraft applications. Other limiting features of such an instrument are that the output is in the form of a mechanical reading, additional arithmetic calculations must be made, and finally the operator must still consult his Sight Reduction Tables and chart the results.

SUMMARY OF THE INVENTION

In accordance with a preferred embodiment a geodetic instrument is disclosed for providing a very accurate measurement of a geodetic angle. The instrument provides an indication of a datum leg of the geodetic angle and a second leg of the geodetic angle relative to the datum leg. The geodetic instrument includes means for measuring the geodetic angle and includes a digital encoder which provides a digital electrical signal indicative of the magnitude of the angle. The instrument further includes a clock for providing an electrical output signal which is an accurate indication of the time at which the measurement is made. The instrument also includes electronics for providing synchronized electrical output signals from the measuring encoder system and the clock which are suitable for further electrical processing and automatic data reduction. With the instrument only a single operator is required to take measurements thereby eliminating the prior art requirement for a second operator and further eliminating synchronization and transcription errors between several operators.

Further, the preferred embodiment includes electronics coupled to the encoder for automatically providing an averaged measurement of the geodetic angle over a given period of time, and electronics coupled to the clock for automatically providing an averaged measurement time. Further, the preferred embodiment includes a display means for displaying the measured geodetic angle and also the time at which the measurement is made. Also, in the preferred embodiment, the disclosed geodetic instrument is a sextant for measuring the angle of a celestial body relative to the horizon, and the system includes electronics for automatically providing an averaged zero reading during the time the instrument is being collimated, electronics for automatically providing an averaged altitude reading over a given period of time, and electronics for automatically providing an averaged time during which the averaged altitude reading is taken.

With the sextant of the present invention it is expected that readout accuracy should approach, the main frame accuracy of a few seconds of arc, which is an extremely accurate reading compared with present sextants. Further, because of the electronic nature of the disclosed sextant, the instrument is computer compatible to enable an accurate, rapid, and relatively simple reduction of several sightings to determine exact position. Because the sighting outputs of the sextant are electrical signals, they may be fed directly into a sight reduction computer as well as being displayed on the output of the instrument. Computer compatibility simplifies the final calculations of position as follows. In the final determination of position sightings of three celestial bodies are generally utilized. The three sightings are typically taken at three different times from different geographic positions since typically the sightings are taken from a moving vehicle, such as a ship or an airplane, on a rotating reference frame (the earth). Thus, the three sightings must be corrected to compensate for the different positions at which they are taken. This type of calculation may be programmed into a computer to automatically and instantaneously provide the navigator with a final positional output once he has taken the three sighting sequences.

BRIEF DESCRIPTION OF THE DRAWINGS

FIG. 3 shows a block diagram of electronics for allowing the instrument of the present invention to be operated in any one of three modes.

DESCRIPTION OF A PREFERRED EMBODIMENT

Figure 1:
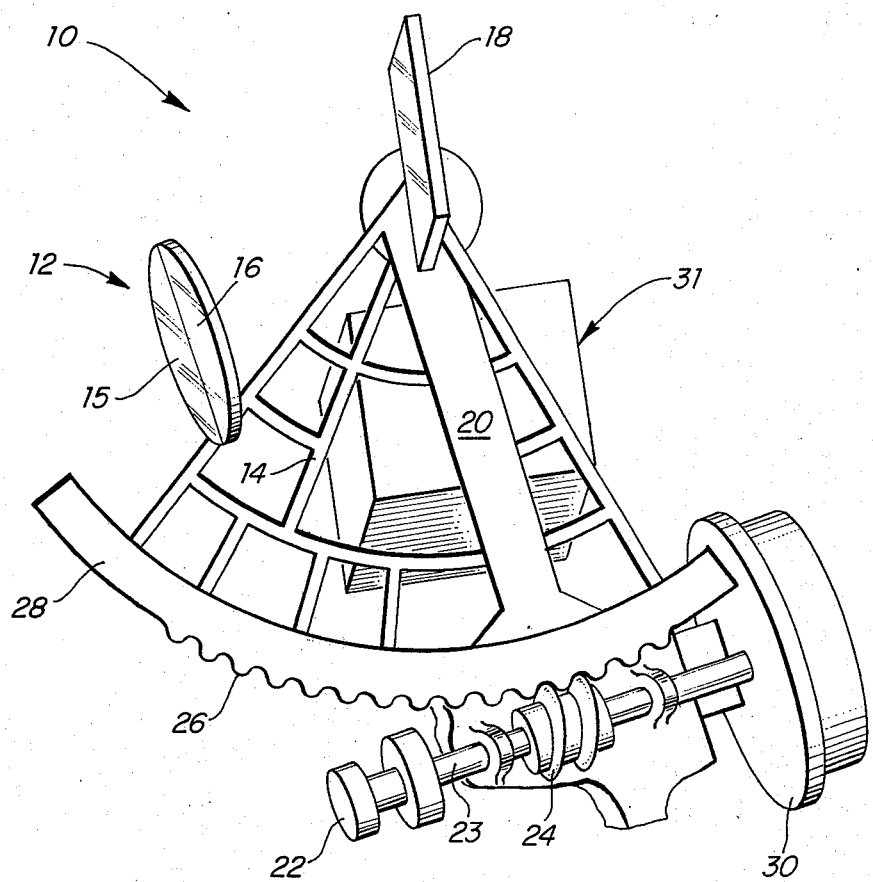
FIG. 1 illustrates a standard prior art sextant modified according to the teachings of this invention.

Referring to FIG. 1, there is illustrated a standard prior art sextant 10 modified according to the teachings of this invention. The sextant includes a horizon mirror/glass 12 rigidly mounted on a frame 14. The horizon mirror/glass is typically one piece and has a mirrored section 15 on the right, referred to as the horizon mirror, and a clear glass section 16 on the left, referred to as the horizon glass. The sextant further includes an index mirror 18 which is rotatable with an index arm 20 such that an image of a celestial body reflected off the index mirror may be aligned with a horizon sighting through the horizon glass. The angle of the index mirror 18 and index arm 20 is adjusted by a micrometer drum 22. Micrometer drum 22 is mounted on a shaft 23 which has a worm gear 24 thereon which engages an arcuate shaped gear pattern 26 on the limb 28 of the sextant frame. The worm gear, shaft and drum are rotatably mounted on the index arm 20, and are normally referred to as the endless tangent screw assembly. The net result of this well known type of movement is that rotation of micrometer drum 22 results in angular movement of index mirror 18 such that the image of a celestial body reflected off index mirror 18 may be aligned with the sighting of the horizon through horizon glass 16. In accordance with the teachings of this invention, the sextant includes a digital shaft encoder 30 which provides a digital electrical ouput signal indicative of the exact angular position of the index mirror. As is known in the art, the encoder may be either an absolute type of encoder with several encoding tracks to produce an electrical signal which completely defines the angular position of index mirror 18, or may be an incremetal shaft encoder which has only one encoding track and which produces an electrical output signal indicative of angular movement of the index mirror 18. In the embodiment illustrated herein, the encoder is an incremental encoder having one track.

Figure 2:
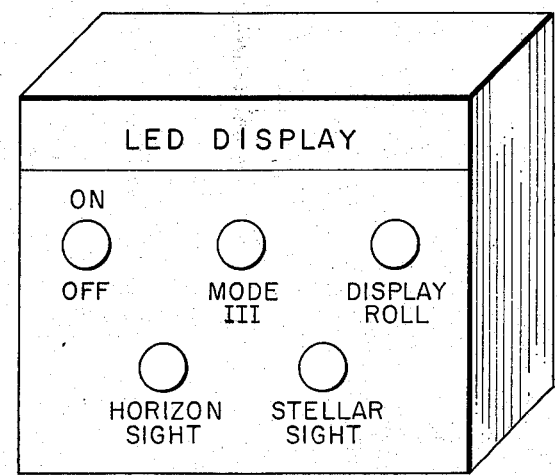
FIG. 2 illustrates a full view of the display and control switches on the electronics package.

With the encoder illustrated in FIG. 1, a sighting is taken by first "collimating" the sextant such that an image of the horizon is reflected from index mirror 18 onto the horizon mirror 15, and is aligned with the horizon sighting through the horizon glass 16. Once the sextant is collimated, an electronic counter is set to zero, and the angular position of a particular celestial body above or below the horizon may be determined by adjusting the angular position of index mirror 18 until an image of the celestial body of interest is aligned with the horizon sighting through horizon glass 16. The total number of pulses out of encoder 30 is then indicative of the angular position of mirror 18 relative to the collimated position. FIG. 1 also shows very schematically the electronic package and display 31, shown in more detail in FIG. 3, mounted directly on the frame of the sextant such that all of the requirements of the present invention may be constructed in one package. FIG. 2 illustrates a full view of the display and control switches on the electronics package. In alternative embodiments, the electronics might be in a separate housing connected to the main sextant by wires, or alternatively some of the circuitry shown in FIG. 3 might be replaced by a general purpose computer to reduce the required electronics package.

Referring to FIG. 3, there is illustrated a block diagram of electronics for allowing the instrument of the present invention to be operated in any one of three modes. The encoder 30, which in the illustrated embodiment is an incremental encoder, is coupled to a 16 bit up-down counter 32 which counts the total number of pulses out of the encoder to keep track of the absolute position of the index mirror 18. The sextant also includes a highly stable system clock 34 which typically might be a crystal oscillator operating in the range of from 32 to 262 kilohertz. A counter 36 counts the total number of pulses out of clock 34 to maintain a highly accurate indication of the time at which a sextant sighting is taken.

The system also includes a digital display 38, which in the preferred embodiment is a set of light emitting diodes. In the preferred embodiment, one display is utilized to sequentially display the value of a number of different parameters. This may be accomplished simply by a multiposition switch, illustrated schematically at 40, which couples the digital display to any of its inputs.

It is believed that the easiest way to explain the circuit of FIG. 3 is to explain its operation.

The first mode of operation of the sextant involves merely a single sighting of the sextant and is as follows. The sextant is first collimated upon the horizon and a horizon sight button 42 is depressed. The initial depression of switch 42 causes a sample circuit 46 to issue a CLEAR command to counter 32 to clear, or zero, the up-down counter 32 such that the sextant is zeroed on the horizon. The up-down counter 32 will then keep an accurate count of further movement of the index mirror. The micrometer knob 22 is then rotated to angularly move the index mirror until the image of a celestial body of interest is aligned with the horizon sighting through the horizon glass. A stellar sight button 44 is then depressed. The initial depression of switch 44 causes sample circuit 46 to issue a LOAD command to counter 50 to parallel load the output of counter 32 into counter 50. The initial depression of switch 44 also causes sample circuit 46 to issue a READ command to a latch memory 52 to read and store the instantaneous time output of counter 36.

As is known in the encoder arts, two detectors placed in a quadrature relationship in the encoder enable the direction of movement of the encoder to be determined. In some instances, the sightings will be negative sightings, and accordingly the first bit of the word stored in both counters 32 and 50 is utilized to indicate whether the count is positive or negative. Sequence logic circuit 54 samples the first bit of the word to determine the sign of the count, and then issues a command to counter 50 to count up or down toward zero. Simultaneously therewith sequence logic circuit 54, which has an input from the system clock, gates clock pulses to a clock multiplexer circuit 56, which may be thought of simply as a switch, which passes the clock pulses into the counter to cause it to count up or down a clock pulse at a time. The total count in the counter 50 is also sampled by a zero detector circuit 58, the function of which is to detect when the count is zero and to issue a GATE OFF signal to sequence logic circuit 54 to stop the flow of counting pulses to the counter. In this manner, the initial altitude reading is first read into counter 50, then the counter 50 is counted to zero at which time the countdown is stopped. The same number of clock pulses used to count couunter 50 to zero is directed over a line 60 to a 24 bit up-down counter 64 where they are totalized. In mode I of operation of this invention, wherein an instantaneous reading is taken, the operator momentarily presses down the stellar sight button 44 to take the stellar reading. Upon release of the stellar sight button, sample circuit 46 sends a pulse over line 66 to sequence logic circuit 68. Sequence logic circuit 68, similar to sequence logic circuit 54, samples the first bit of the word to determine whether the stored word is positive or negative, and issues a command to the counter to count up or down. Simultaneously therewith it also gates system clock pulses to a clock multiplexer circuit 70, similar to circuit 56, which passes the pulses to the counter to cause the counter to count up or down. A zero detector circuit 72, similar to zero detector circuit 58, detects when the 24 bit up-down counter 64 reaches zero, and issues a GATE OFF command to sequence logic circuit 68 to stop the flow of counting pulses to the counter. The total number of pulses gated into the counter to count the counter to zero is also directed over a line 74 to DIVIDE BY N circuit 76 which totalizes the pulses and divides by a number N, which is the number of sights taken and which in the instantaneous mode is one. Divide by N circuit 76 may be a programmable divider circuit which puts out one output pulse for each N pulses received from clock multiplexer 70. The output of the Divide by N circuit for the instantaneous mode will thus be the same number of pulses which was initially stored in counter 32. This number of pulses defines the altitude of the sighting taken, and is directed into a Degree, Minute, Second (or tenths of minute) Converter 78 which performs a straight arithmetic translation to those units, and the output of which is directed as an input to display 38. Converter 78 produces an output when it does not receive an INHIBIT signal over the HORIZON SIGHT line 67 from sample circuit 46, which signal indicates a horizon, as opposed to a stellar, sighting is being taken. Display 38 thus has an input from latch memory 52, which is the instantaneous time the sighting was taken, and an input from converter 78 which is the altitude reading and which is available simultaneously with the release of stellar sight button 44. These readings may be displayed sequentially by flipping switch 40.

The sextant operates in the second mode, which is the averaged mode, as follows. The sextant is first sighted on the horizon to collimate the instrument. The horizon sight button 42 is depressed while the operator tracks the horizon and is held down for a period of time over which the horizon collimating sighting is desired to be averaged. As in mode I, the initial depression of button 42 causes sample circuit 46 to issue a CLEAR command to counter 32. The maintained depression of button 42 also activates a second function of sampling circuit 46 which is receiving a pulse per second from a divide circuit 48. Divide circuit 48 simply divides the pulses from clock 34 by a given constant to achieve a 1 hertz pulse train. The sampling circuit 46 causes 16 bit up-down counter 50 to parallel load the output of 16 bit up-down counter 32 at the initial depression of button 42 and again once per second in accordance with pulses received from circuit 48. As the sextant micrometer drum 22 will not be held exactly still but will be continuously adjusted with fluctuations above and below the horizon, it is probable that the average position of the sextant will exactly define the horizon, and that an average reading, which is taken once every second, will define the exact position of the horizon.

In the averaged mode, the sampling circuit 46 causes the contents of counter 32 to be parallel loaded into counter 50 at the initial depression of button 42 and at one second intervals thereafter. Each time a number is loaded into counter 50, sequence logic circuit 54 selects a count-up or count-down mode for that counter and gates system clock pulses to clock multiplexer 56 which passes the system clock pulses to the counter to count it to zero, at which time zero detect circuit 58 causes sequence logic circuit 54 to turn off the clock pulses. The same clock pulses used to count counter 50 to zero are totalized in counter 64, and at the end of the first sample, counter 64 will contain the number that was loaded into counter 50 from counter 32, and counter 50 will contain zero. This same operation is repeated at one second intervals with counter 64 totalizing the total number of counts received from counter 50. Counter 64 thus accumulates the algebraic sum of the angles in counter 32 at each sample time. While this operation is proceeding, a sample counter 80 counts the total number of sample pulses generated. When the operator releases the horizon sight button, or, in the preferred embodiment 128 seconds after the button is depressed, whichever comes first, a pulse is generated by sample circuit 46 over line 66 to activate sequence logic circuit 78 to cause counter 64 to count-down its total count, which is the sum of the total counts for each of the total number N of horizon sights taken. Sequence logic circuit 68 then directs counter 64 to count up or down toward zero, and gates system clock pulses to clock multiplexer circuit 70 which passes the clock pulses to counter 64 to count it to zero. At zero, a zero detector circuit 72 issues a GATE OFF command to sequence logic 68 to stop the flow of counting pulses. As in mode I, the clock pulses used to count counter 64 to zero are directed to programmable divider circuit 76 which divides the total number of count pulses received over line 74 by the number of sights N stored in counter 80. Thus, all of the horizon sightings taken are divided by the number N of sightings to produce a number of pulses corresponding to the average horizon sighting at the output of circuit 76.

Since all stellar measurements should be made relative to the horizon, ideally counter 32 (and also the output of Divide by N circuit 76) should read zero when the instrument is pointing at the horizon. Because of operator instability, the instrument will not always point exactly at the horizon when the horizon sight button is initially depressed which clears, or zeros, counter 32. The average value that position counter 32 differs from zero during the average horizon sighting is the effective output of circuit 76. These pulses from Divide by N circuit 76 are directed over line 84 to clock multiplexer 56. At the time of release of horizon sight button 42, sample circuit 46 issues a command over line 66 to sequence logic circuit 68. This same command is directed to clock multiplexer 56 along with a command on the HORIZON SIGHT line 67 (which indicates a horizon sighting is being taken) to cause it to pass pulses received over line 84 to counter 50 where they are counted and stored. A 16 bit adder circuit 86 constantly subtracts the value in counter 50 from the value in counter 32 to obtain a difference value. When counter 32 receives a signal on the HORIZON SIGHT line 67, which indicates a horizon sighting is being taken, and a signal from zero detector 72, which indicates the sighting is completed and counter 64 has been counted down, it loads the difference value from adder 86 and freezes that value. Counter 32 is now zeroed on the averaged reading which was taken during the averaged horizon sighting and not on the initial reading which was taken when horizon sight button 42 was initially depressed.

The operator then sights the sextant on a celestial body of interest, and depresses the stellar sight button 44 for a given period of time over which it is desired to average the stellar sighting. With the 16 bit up-down counter now zeroed on the average horizon sighting, the circuit operates to average the stellar sighting in the same manner as the horizon sighting was averaged but with the stellar sigh button now controlling the functions. The only differences in function are: clock multiplexer 56 does not load a value from Divide by N circuit 76 since it does not receive a signal from HORIZON SIGHT line 67; counter 32 does not load a signal from adder 86 since it also does not receive a signal from HORIZON SIGHT line 67; and converter 78 does convert the output from circuit 76 to degrees, minutes, and seconds (or tenths of minutes) since a signal on HORIZON SIGHT line 67 does not inhibit it. At the end of the averaged stellar reading the output of converter 78 may be displayed on display 38 by a proper setting of switch 40.

In mode II, the averaged mode, the averaged time of a sighting is also desired. The initial depression of stellar sight button 44 causes sample circuit 46 to issue a READ command to latch memory 52 to store in memory the beginning time of the sighting from counter 36. The sample counter 80 has a count of one pulse for the initial depression of the stellar sight button and an additional number of counts at one second intervals over which the average stellar sighting is taken. By dividing the output N of sample counter 80 in a divide by two network 88, the average interval of the averaged stellar sighting is obtained. This is added in circuit 90 to the initial time stored in latch memory 52 to produce an averaged stellar sighting time which is directed over a line 92 to display 38, and which may be displayed by a proper setting of switch 40.

In mode III of operation of the instrument, advantage is taken of the precise clock within the instrument, and the instrument is utilized solely as a chronometer, which by itself in the prior art is a fairly expensive instrument. By flipping a mode III switch 90, the instantaneous output of counter 36 is available as an input to display 38, and may be displayed by a proper setting of switch 40.

One of the advantages of the instrument disclosed herein is that although electronic equipment has been added to a basic sextant to make the basic sextant far more accurate than a typical prior art sextant, the sextant may still be utilized in a manual mode if for any reason the electronic equipment should prove faulty. Although the preferred emodiment illustrates a sextant the teachings of this invention are also applicable to other types of geodetic instruments. While several embodiments have been described, the teachings of this invention will suggest many other embodiments to those skilled in the art.

I claim:

1. An improved double-reflecting sextant for accurately measuring an angle and for automatically providing angular measurement and time electrical output signals which are suitable for further electrical processing and automatic data reduction and comprising:
   a. a sextant including means for measuring an angle and including a horizon mirror-glass and an index mirror, whereby the sextant may be collimated by aligning an image of the horizon on the index mirror with a horizon sighting through the horizon mirror-glass, and then the altitude of a celestial body above the horizon may be measured by adjusting the angular position of the index mirror until an image of the celestial body on the index mirror is aligned with a horizon sighting through the horizon mirror-glass, and a digital encoder means for providing a digital electrical signal indicative of the magnitude of said measured angle;
   b. clock means for providing an accurate indication of the time at which the measurement is made and for producing an electrical output signal indicative of that time; and
   c. electronic means, including means actuated by the operator for completing an electrical circuit for a given period of time, for automatically providing synchronized output electrical signals from said measuring means and said clock means which are suitable for further electrical processing and automatic data reduction, said electronic means including first electronic means coupled to said encoder means for automatically providing an average of said angle measurement over the given period of time, and second electronic means coupled to said clock means for automatically providing an averaged time during which the measurement is made over the given period of time, whereby a single operator may take measurements with the sextant thereby eliminating the requirement for a second operator, and further eliminating synchronization and transcription errors between several operators.

2. A sextant as set forth in claim 1 wherein said first electronic means includes means for automatically providing an averaged zero reading during the time the sextant is being collimated, and means for automatically providing an averaged altitude reading over a given period of time.

3. A sextant as set forth in claim 2 and including display means, coupled to said first and second electronic means, for displaying said average of said angle measurement and said averaged time.

4. A sextant as set forth in claim 3 and including means for allowing said clock means to be utilized solely as a chronometer.

5. A sextant as set forth in claim 1 and including display means for displaying said measured angle and the time of measurement.

6. A sextant as set forth in claim 1 and including means for allowing said clock means to be utilized solely as a chronometer.

* * * * *